United States Patent
Felde et al.

(10) Patent No.: US 10,900,381 B2
(45) Date of Patent: Jan. 26, 2021

(54) OIL SEALING UNIT FOR A TURBOCHARGER

(71) Applicant: BorgWarner Inc., Auburn Hills, MI (US)

(72) Inventors: Svetlana Felde, Mannheim (DE); Andreas Didion, St. Wendel (DE)

(73) Assignee: BorgWarner Inc., Auburn Hills, MI (US)

( * ) Notice: Subject to any disclaimer, the term of this patent is extended or adjusted under 35 U.S.C. 154(b) by 207 days.

(21) Appl. No.: 16/087,483

(22) PCT Filed: Mar. 20, 2017

(86) PCT No.: PCT/US2017/023138
§ 371 (c)(1),
(2) Date: Sep. 21, 2018

(87) PCT Pub. No.: WO2017/165261
PCT Pub. Date: Sep. 28, 2017

(65) Prior Publication Data
US 2019/0101025 A1 Apr. 4, 2019

(30) Foreign Application Priority Data
Mar. 22, 2016 (DE) .......... 10 2016 204 739

(51) Int. Cl.
*F01D 25/18* (2006.01)
*F01D 11/00* (2006.01)
*F01D 25/16* (2006.01)

(52) U.S. Cl.
CPC .......... *F01D 25/183* (2013.01); *F01D 11/003* (2013.01); *F01D 25/16* (2013.01);
(Continued)

(58) Field of Classification Search
CPC ........ F01D 25/183; F01D 25/16; F01D 25/18; F01D 11/003; F16C 33/1025
See application file for complete search history.

(56) References Cited

U.S. PATENT DOCUMENTS 4,645,213 A * 2/1987 Washimi ................ F16J 15/406
277/347
4,664,605 A * 5/1987 Asano ................... F01D 25/183
417/407

(Continued)

FOREIGN PATENT DOCUMENTS

| CN | 201262116 Y | 6/2009 |
|---|---|---|
| DE | 102013005167 B3 | 9/2014 |

(Continued)

OTHER PUBLICATIONS

Written Opinion and International Search Report dated Sep. 6, 2017, in International Application No. PCT/US2017/023138.

*Primary Examiner* — Eldon T Brockman
(74) *Attorney, Agent, or Firm* — Eric L. Doyle; Stephan A. Pendorf; Patent Central LLC

(57) ABSTRACT

Oil sealing unit for a turbocharger used for sealing a passage from a bearing housing to a compressor housing. An end wall serves to delimit an oil expansion chamber in the direction of a compressor wheel. A sealing sleeve is designed for a non-rotating connection with a shaft, which connects the compressor wheel to a turbine wheel. The sealing sleeve is at least partially surrounded by the end wall. An oil guiding means is designed in such a way that an overhang is formed in relation to an oil deflection ring and in a direction radially upward in relation to at least a portion of the oil deflection ring. A sealing gap is formed between the overhang of the oil guiding means and the oil deflection ring.

18 Claims, 3 Drawing Sheets

(52) U.S. Cl.
CPC .......... *F01D 25/166* (2013.01); *F01D 25/18* (2013.01); *F05D 2220/40* (2013.01); *F05D 2240/55* (2013.01)

(56) References Cited

U.S. PATENT DOCUMENTS

| | | | | |
|---|---|---|---|---|
| 8,348,595 | B2* | 1/2013 | Koch | ................... F01D 25/16 |
| | | | | 415/104 |
| 9,328,628 | B2* | 5/2016 | Schenkenberger | ... F01D 25/162 |
| 9,822,700 | B2* | 11/2017 | Annati | ................. F01D 5/025 |
| 9,835,054 | B2* | 12/2017 | Weber | ................. F01D 25/186 |
| 2010/0139270 | A1* | 6/2010 | Koch | ................... F01D 25/16 |
| | | | | 60/605.3 |
| 2013/0183144 | A1* | 7/2013 | Schenkenberger | ..... F01D 25/16 |
| | | | | 415/170.1 |
| 2016/0265426 | A1* | 9/2016 | Annati | ............... F16C 33/6685 |

FOREIGN PATENT DOCUMENTS

| | | |
|---|---|---|
| JP | 2004132319 A | 4/2004 |
| WO | 2008042698 A1 | 4/2008 |

* cited by examiner

OIL SEALING UNIT FOR A TURBOCHARGER

FIELD OF THE INVENTION

The present invention relates to an oil sealing unit for a turbocharger and a turbocharger with a corresponding oil sealing unit.

BACKGROUND OF THE INVENTION

An increasing number of the latest generation of vehicles are being equipped with turbochargers. In order to achieve the specified goals and legal requirements, it is important to further the development of the entire powertrain as well as to optimize both the individual components therein and the system as a whole with regard to reliability and efficiency.

Turbochargers are well known devices comprising a turbine housing, a compressor housing and a bearing housing, said bearing housing normally connected on the turbine side to the turbine housing and on the compressor side to the compressor housing. Situated inside the bearing housing is a shaft, which supports the turbine wheel and the compressor wheel. Inside the bearing housing interior, which is separated from the interior of the compressor housing by a rear wall, for example in the form of a bearing housing cover, are generally located a radial bearing and a thrust bearing. In addition, an oil deflector plate as well as a sealing sleeve may be provided. The specific design and arrangement of the end wall, sealing sleeve, the optional oil deflector plate and possible additional components, such as piston rings, serves thereby to seal the interior of the compressor housing from escaped oil, which is needed for the bearing, coming from the bearing housing interior. Due to the high speed of rotation of the shaft and the widely varying pressures which may exist in these areas, sealing the passage between the bearing housing and the interior of the compressor housing presents difficulty.

The object of the present invention is therefore to provide an oil sealing unit for a turbocharger which ensures a reliable sealing action during a wide variety of operational scenarios.

SUMMARY OF THE INVENTION

The present invention relates to an oil sealing unit for a turbocharger according to claim 1 and a turbocharger according to claim 15.

The oil sealing unit for a turbocharger according to the invention used to seal a passage from a bearing housing to a compressor housing comprises an end wall, a sealing sleeve, an oil deflector ring and an oil guiding means. The end wall serves to delimit an oil expansion chamber in the direction of a compressor wheel. The sealing sleeve is designed for a non-rotating connection with a shaft that connects the compressor wheel to a turbine wheel. For this purpose, the sealing sleeve is at least partially surrounded in the radial direction by the end wall. The oil guiding means is designed in such a way that an overhang is formed in relation to the oil deflection ring and in a direction radially upward in relation to at least a portion of the oil deflection ring, thereby forming a sealing gap between the overhang of the oil guiding means and the oil deflection ring. The advantage in doing so is that the oil to be guided away can be led via the overhang directly to the oil deflection ring. The entry of oil into the areas leading in the direction of the compressor wheel is thus avoided. Moreover, the gap formed between the overhang and the oil deflection ring serves to further improve the sealing action between the oil-bearing areas of the bearing housing and the compressor housing interior.

Embodiments may have an oil deflection ring exterior side, which points into the oil expansion chamber, running oblique relative to a line perpendicular to the shaft axis. The oil can flow particularly well along the oblique surface of the oil deflection ring exterior side, thus facilitating the flow of oil back into the bearing spaces.

Specifically, the oil deflection ring and the sealing sleeve may in all embodiments form a one-piece component or, alternatively, there may be two separate components.

In embodiments able to be combined with all embodiments described thus far, the end wall can be in the form of a bearing housing cover. Alternatively, the end wall can be in the form of a compressor housing rear wall.

In embodiments able to be combined with all embodiments described thus far, at least one sealing ring, preferably in the form of a piston ring, and in particular two or three sealing rings, may be provided between the end wall and the sealing sleeve. The sealing gap between the overhang and the oil deflector ring may have a width of between 0.1 mm and 0.5 mm, specifically between 0.2 and 0.3 mm, and preferably approximately 0.25 mm.

In embodiments able to be combined with all embodiments described thus far, the width of the oil deflection ring as viewed from a radial direction may increase radially inward, thereby forming the oblique exterior. Alternatively or additionally, a region of the oil deflection ring disposed radially outward in the direction of the compressor wheel may be tilted, thereby forming the oblique exterior.

In embodiments able to be combined with all embodiments described thus far, the oil guiding means may be an integral part of the end wall, and the overhang may be formed in such a way that oil is directed from the overhang to the oil deflection ring. The overhang and the oil deflection ring can together form a labyrinth seal. In particular, a sealing gap can be formed which runs axially between the overhang and the oil deflector ring. A sealing gap can be formed running radially between the oil deflector ring and the end wall; in particular, the sealing gap running in a radial direction can be adjacent to the sealing gap running in an axial direction. A sealing gap can be formed running obliquely between the overhang and the oil deflector ring, in particular adjacent to the sealing gap running in a radial direction. The oil deflector can be adjacent in an axial direction to the bearing boss of a thrust bearing.

In embodiments able to be combined with all embodiments described thus far, an oil deflector plate can be provided. The oil deflector plate can be arranged in such a way that it at least partially delimits the oil expansion chamber axially in the direction of a thrust bearing and/or radial bearing for the shaft. The outer circumferential area of the oil deflector plate may feature a tongue, which extends obliquely and radially outward and serves for returning the oil.

In embodiments able to be combined with all embodiments described thus far, the oil guiding means may be formed as a nose-shaped protrusion on the rear wall, thus forming the overhang. The nose-shaped protrusion can have an oblique outer surface, and the orientation of the oblique outer surface of the protrusion in particular may be approximately parallel to the oblique exterior side of the oil deflector ring. The oblique outer surface of the protrusion can thereby constitute a virtual extension of the oblique exterior side of the oil deflection ring.

As an alternative to the embodiment as a nose-shaped protrusion, the end wall can feature a recess, whereby the oil deflector ring protrudes into the recess, and whereby the overhang of the oil guiding means is defined by a sidewall of the recess disposed radially outward. In doing so, the inclined region of the oil deflector ring disposed radially outward can specifically protrude into the recess, thereby creating the overhang. Furthermore, a sidewall of the recess disposed radially inward can run in a direction oblique relative to a line perpendicular to the shaft axis and preferably parallel to the inclined region of the oil deflector ring exterior side pointing radially inward, and, in doing so, a sealing gap can in particular be formed, which runs obliquely between the inwardly disposed sidewall and the inwardly pointing exterior side.

As an alternative to the integral component design for the end wall, the oil guiding means can be provided in the form of an oil deflector plate; the cross section of the oil plate in particular can be designed to be at least partially v-shaped or u-shaped. In doing so, a radially inner limb of the oil deflector plate can define the overhang. The overhang can at least partially surround the oblique exterior side of the oil deflector ring, thereby forming the sealing gap between the oil deflector ring and the oil guiding means; the overhang in particular can run at least partially parallel to the oblique exterior side. The internal diameter of the oil deflector plate can be smaller than the largest external diameter of the oil deflector ring. The end wall can feature an inner lip extending in an axial direction and at least partially surrounded at an axial end by the oil deflector ring. In this way, a sealing gap is formed between the inner lip and the oil deflector ring. The inner lip in particular can feature a ring-shaped flow channel. This ring-shaped flow channel has the advantageous effect of guiding the oil away from this area of the oil sealing unit in addition to aiding the sealing effect by preventing the oil from moving in the direction of the compressor housing interior. The outer circumferential area of the oil deflector plate can feature a tongue, which extends obliquely and radially outward and serves for returning the oil.

The invention further comprises a turbocharger for an internal combustion engine having one of the previously described oil sealing unit embodiments.

DETAILED DESCRIPTION

Embodiments are described in the following with reference to the accompanying figures in regard to the oil sealing unit for a turbocharger according to the invention used to seal a passage from a bearing housing to a compressor housing.

Figure 1:
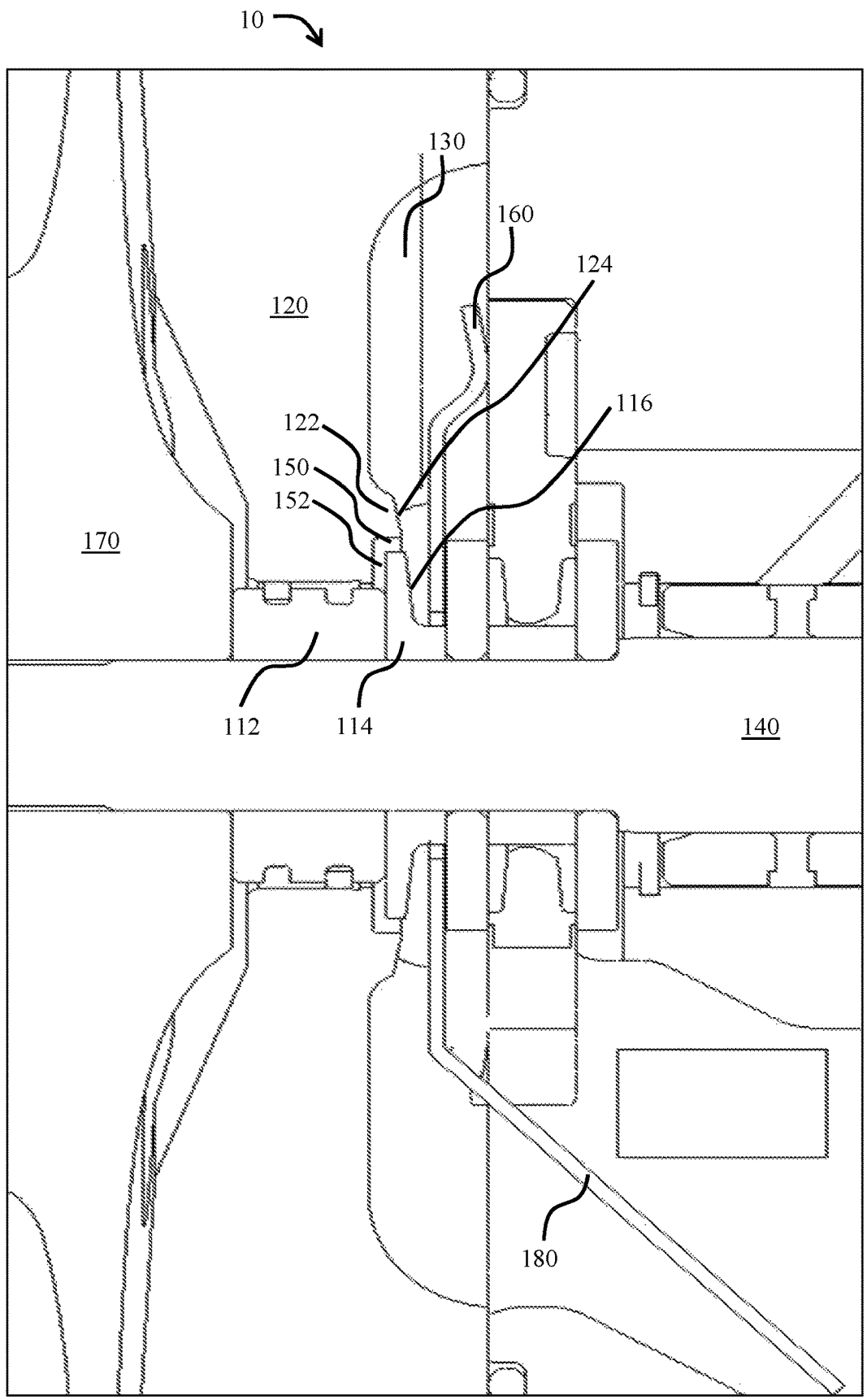
FIG. 1 shows a section view of a first embodiment of the oil sealing unit according to the invention.

FIG. 1 shows a first embodiment of the oil sealing unit 10 according to the invention. The oil sealing unit 10 comprises an end wall 120, a sealing sleeve 112, an oil deflector ring 114 and an oil guiding means 122. The oil sealing unit 10 accommodates an oil expansion chamber 130, whereby the end wall 120 delimits the oil expansion chamber 130 in the direction of a compressor wheel 170 of the turbocharger. As is shown in FIG. 1, the sealing sleeve is arranged around a shaft 140 of the turbocharger, and is designed for a non-rotating connection with the shaft 140. As is also evident in FIG. 1, the sealing sleeve 112 is at least partially surrounded in the radial direction by the end wall 120. The oil guiding means 122 is designed in such a way that an overhang is formed in relation to the oil deflection ring 114 that projects outward in a radial direction in relation to at least a portion of the oil deflection ring 114. In this way, a sealing gap is formed between the oil guiding means 122 and the oil deflector ring 114. The advantage in doing so is that the oil to be guided away can be led via the overhang directly to the oil deflection ring 114. The entry of oil into the areas leading in the direction of the compressor wheel is thus avoided. Moreover, the gap formed between the overhang and the oil deflection ring 114 serves to further improve the sealing action between the oil-bearing areas of the bearing housing and the compressor housing interior. The sealing gap between the overhang and the oil deflector ring 114 may have a width of between 0.1 mm and 0.5 mm, specifically between 0.2 and 0.3 mm, and preferably approximately 0.25 mm. The width of the gap should be understood as the smallest distance between two components, the oil deflection ring 114 and the overhang. The dimensions indicated here for the sealing gap between the oil deflector ring and the overhang are equally valid for the oil sealing units 20 and 30 in the embodiments shown in FIG. 2 and FIG. 3, which are described below in further detail.

As is evident in FIG. 1, the exterior side 116 of the oil deflection ring 114, which points into the oil expansion chamber 130, runs oblique relative to a line perpendicular to the rotational axis of the shaft 140. The oil can flow particularly well along the oblique surface of the oil deflection ring 114 exterior, thus facilitating the flow of oil back into the bearing spaces. The term oblique means that an imaginary line running perpendicular to the rotational axis of the shaft 140 and the exterior side 116 will make an angle of between 0 and 90 degrees. As is clear from FIG. 1, the width of the oil deflection ring 114 as viewed from a radial direction can increase radially inward (in the direction of the shaft 140), thereby forming the oblique exterior side 116. Alternatively (see, for example, FIG. 2 or also additionally (not illustrated in the drawings), a region of the oil deflection ring disposed radially outward in the direction of the compressor wheel 170 may be tilted, thereby forming the oblique exterior side.

FIG. 1 shows the oil deflection ring 114 and the sealing sleeve 112 as two separate components, whereby the oil deflection ring 114 is designed to be arranged axially adjacent to the sealing sleeve in the direction of the bearing area as well as non-rotatably connected to the shaft 140. In an alternative embodiment of the invention, the oil deflection ring 114 and the sealing sleeve 112 can be formed as a one-piece component. One-piece construction can offer benefits in terms of production costs (one component) as well as faster turbocharger assembly times. In addition, assembly errors can be avoided by reducing the number of parts.

As illustrated in the embodiment in FIG. 1, the end wall 120 can be formed by the compressor housing rear wall. The integral construction in this case likewise leads to production, assembly and cost advantages. Alternatively, the end wall can also be in the form of a bearing housing cover (see the embodiment in FIG. 3).

Arranged between the end wall 120 and the sealing sleeve 112 are two sealing rings, preferably in the form of piston rings. Alternatively, only one sealing ring may be provided, or three or more sealing rings may be provided.

FIG. 1 shows the oil guiding means 122 as an integral element of the end wall 120 (here in the form of the compressor housing rear wall). The overhang of the oil guiding means 122 is formed in such a way that, during the operation of the turbocharger, oil can be directed from the overhang to the oil deflection ring 114. This means, for example, that the oil is directed from the overhang to the oblique exterior side 116 of the oil deflection ring 114, which has an advantageous effect on the flow of the oil. Together with the oil deflection ring 114, the overhang thereby forms a labyrinth seal. Also visible in FIG. 1 is a sealing gap 150 running axially between the overhang and the oil deflector ring 114. In addition, a radial sealing gap 152 runs between the oil deflector ring 114 and the end wall 120, whereby the sealing gap 152 running in a radial direction is adjacent to the sealing gap running 150 in an axial direction. In an installed condition in the turbocharger, the oil deflection ring 114 itself is adjacent in an axial direction to a bearing boss of a thrust bearing.

The embodiment in FIG. 1 further comprises an oil deflector plate 160. As regards mounting, the oil deflector plate can, for example, be clamped between the bearing housing and the compressor housing or rather the bearing housing cover (for example, via lugs facing radially outward), bolted to one of the two housings or rather to a bearing cover, welded, soldered, press-fitted, caulked or mounted by using some other means of attachment. The oil deflector plate 160 may be arranged in such a way that it at least partially delimits the oil expansion chamber 130 axially in the direction of a thrust bearing and the subsequently adjacent radial bearing for the shaft 140 (see FIG. 1). The outer circumferential area of the oil deflector plate 160 may feature a tongue 180 (indicated at the bottom of FIG. 1), which extends obliquely and radially outward and serves for returning the oil.

The integral design of the oil guidance means 122 in the embodiment shown in FIG. 1 is realized as a nose-shaped protrusion on the end wall 120. This protrusion forms the overhang. As is evident in FIG. 1, the nose-shaped protrusion features an oblique outer surface 124. In the example shown, the orientation of the oblique outer surface 124 of the protrusion is approximately parallel to the oblique exterior side 116 of the oil deflector ring 114. Consequently, the oblique outer surface 124 of the protrusion constitutes a virtual extension of the oblique exterior side 116 of the oil deflector ring 114. In alternative embodiments, however, the outer surface 124 and the exterior side 116 cannot also run in a parallel direction.

Figure 2:
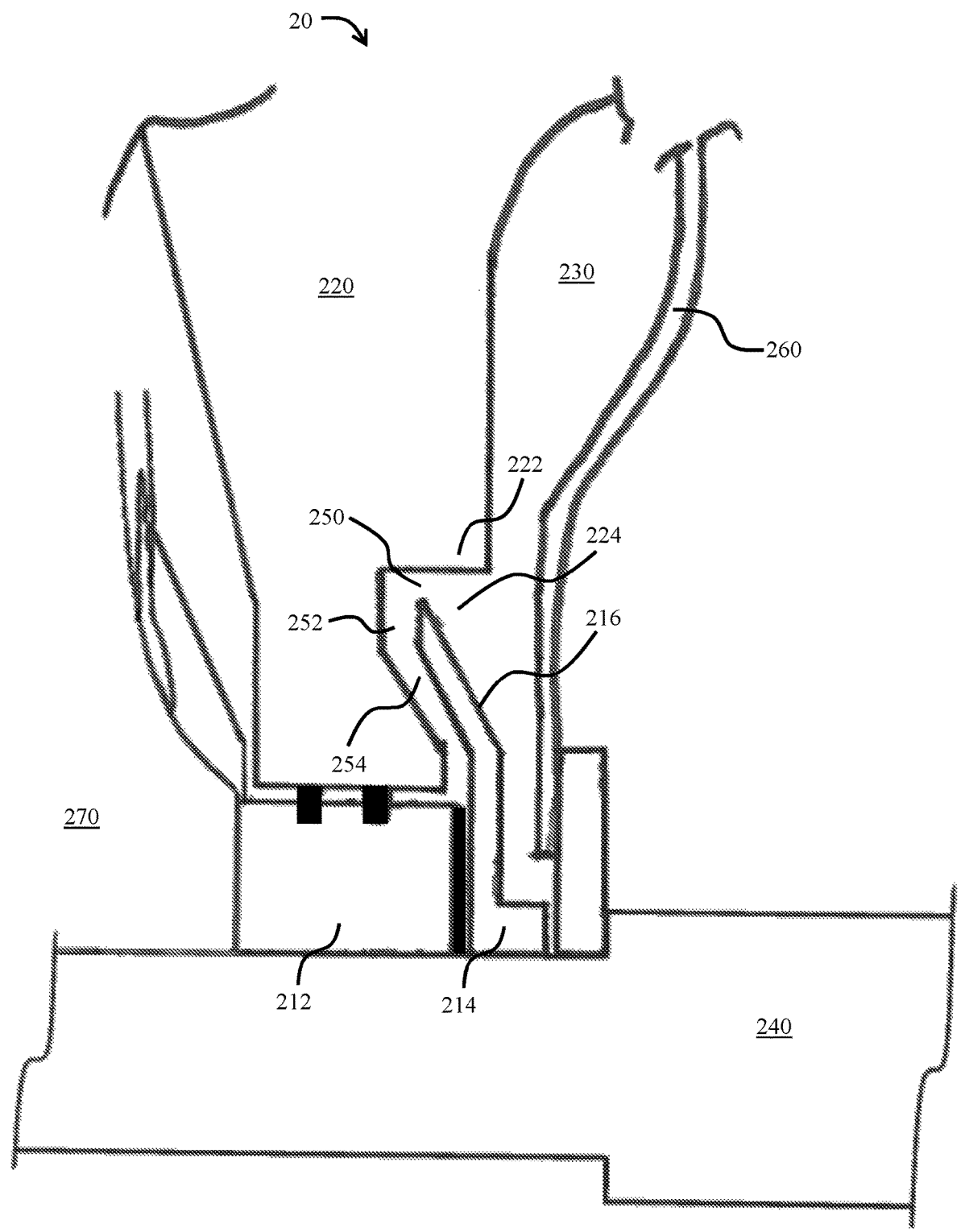
FIG. 2 shows a section view of a second embodiment of the oil sealing unit according to the invention.

FIG. 2 shows a second embodiment of the oil sealing unit 20 according to the invention. The embodiment in FIG. 2, in accordance with the example in FIG. 1 has an end wall 220, a sealing sleeve 212, an oil deflector ring 214 and an oil guiding means 222. The end wall 220 likewise serves to delimit an oil expansion chamber 230 in the direction of a compressor wheel 270, whereby the example in FIG. 2 also shows an end wall in the form of the compressor housing rear wall. The sealing sleeve 212 is likewise at least partially surrounded in a radial direction by the end wall 220, and the oil guiding means 222 is designed in such a way that an overhang is formed in relation to the oil deflection ring 214 and in a direction radially upward in relation to at least a portion of the oil deflection ring 214, thereby forming a sealing gap between the overhang of the oil guiding means 222 and the oil deflection ring 214. This manner of arrangement offers the same advantages for the embodiment in FIG. 2 as were described above in connection with FIG. 1.

Just as in the first embodiment, running in a direction oblique relative to a line perpendicular to the axis of the shaft 240 is an exterior side 216 of the oil deflection ring 214, which points into the oil expansion chamber 230, thus allowing the oil to flow particularly well and facilitating its return back into the bearing spaces. Like the example in FIG. 1, the oil deflection ring 214 and the sealing sleeve 212 can be formed as a one-piece component or, alternatively, there can be two separate components (as shown in FIG. 2). The same is true of the sealing rings between the end wall 220 and the sealing sleeve 212, preferably in the form of piston rings: two sealing rings are shown, but only one sealing ring or three or more sealing rings may also be provided.

In the example in FIG. 2, the oblique exterior side 216 is formed due to a region of the oil deflector ring 214 disposed radially outward in the direction of the compressor wheel 270 being tilted.

Similar to the first embodiment, FIG. 2 shows an embodiment of the invention in which the oil guiding means 222 is an integral part of the end wall 220 (in this case a compressor housing rear wall), and the overhang is formed in such a way that oil is directed from the overhang to the oil deflection ring 214. In contrast to the nose-shaped protrusion in the example from FIG. 1, the end wall 220 in the example from FIG. 2 features a recess 224, whereby the oil deflector ring 214 protrudes into the recess 224, and whereby the overhang of the oil guiding means 222 is defined by a sidewall of the recess 224 disposed radially outward. The inclined region of the oil deflector ring 214 disposed radially outward thus protrudes into the recess 224, thereby creating the overhang. FIG. 2 furthermore shows a sidewall of the recess 224 disposed radially inward and running in a direction oblique relative to a line perpendicular to the axis of the shaft 240 (oblique having the same meaning here as in the more detailed definition above) and parallel to the inclined region of the oil deflector ring 214 exterior side pointing radially inward. This more or less creates a second overhang, in this case from the oil deflector ring 214 to an inner portion of the end wall 220. In this way, a sealing gap 254 is formed, which runs obliquely between the radially inward pointing sidewall of the recess 224 in the end wall 220 and the inwardly pointing exterior side.

The overhang formed by the recess 224 has the effect that the oil is directed from the overhang (more precisely: the corner segment of the end wall 220 at the radially outer end of the recess) to the oblique exterior side 216 of the oil deflection ring 214, which once again has an advantageous effect on the flow of the oil. Together with the oil deflection ring 214, the overhang, or rather the recess 224, thereby forms a labyrinth seal. As in FIG. 1, there is also in FIG. 2 a sealing gap 250 running axially between the overhang and the oil deflector ring 214. Furthermore, a radial sealing gap 252 runs between the oil deflection ring 214 and the end wall 220 (the radial wall of the recess 224), whereby the sealing gap 252 running in a radial direction is adjacent to a sealing gap 250 running in an axial direction. Further shown in FIG. 2 is the sealing gap 254 described above, which runs obliquely between the end wall 220 (the sidewall of the recess 224 disposed radially inward) and the oil deflector ring 214, in particular adjacent to the sealing gap 252 running in a radial direction. The oil deflector ring 214 is designed in order to be arranged on the shaft 240 in an axial direction between the sealing sleeve 212 and a bearing boss of a thrust bearing. Furthermore, the recess 224 can feature a flow channel in the form of a groove (not illustrated in FIG.

2). The groove can thereby be arranged between the radial wall and the wall of the recess 224, said wall running in an oblique direction.

In regard to the design and arrangement of the oil deflection plate 260, let reference be made to the explanations respecting the example in FIG. 1, which are accordingly valid for the embodiment in FIG. 2.

Figure 3:
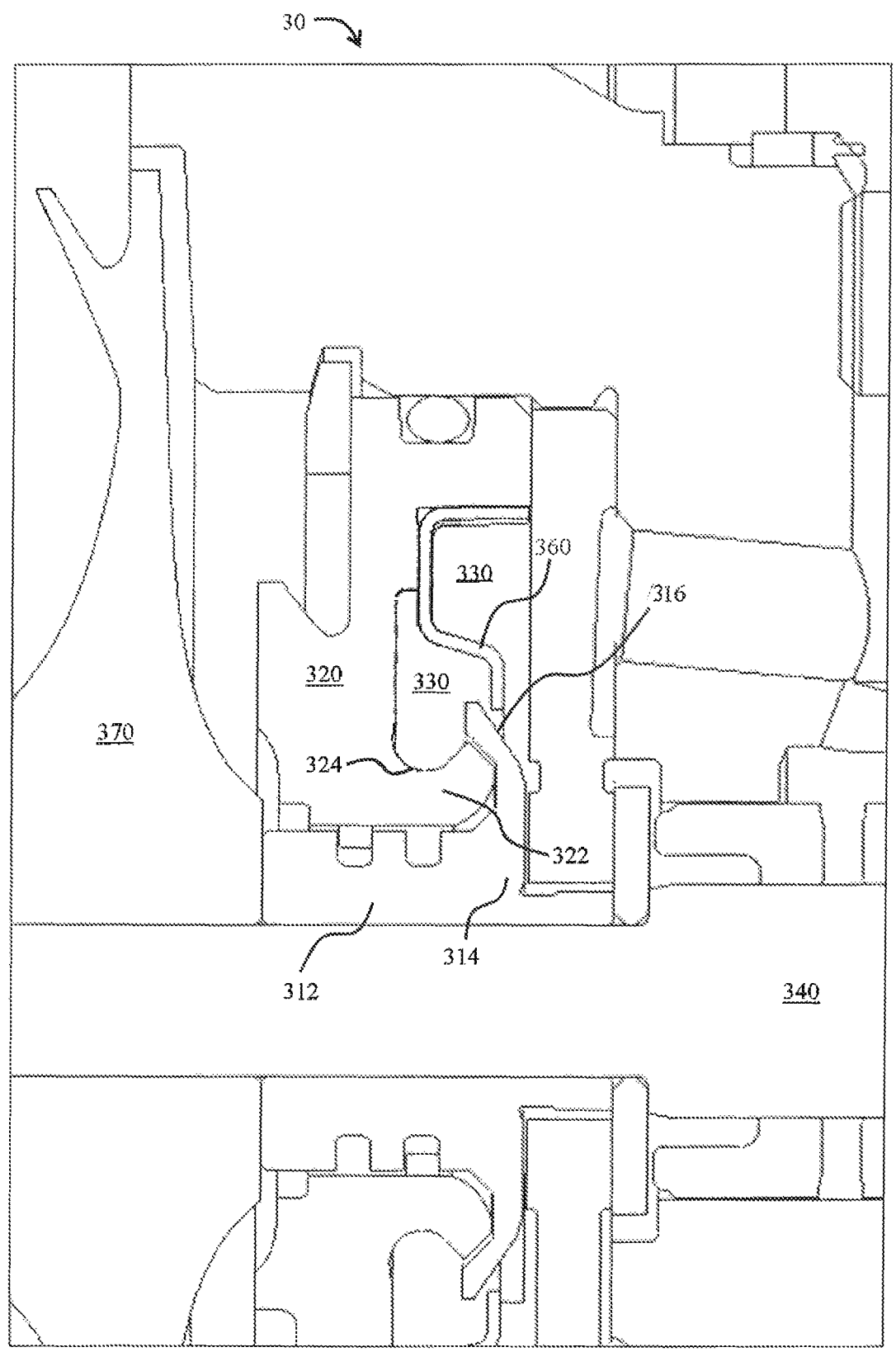
FIG. 3 shows a section view of a third embodiment of the oil sealing unit according to the invention.

FIG. 3 shows a third embodiment of an oil sealing unit 30 according to the invention. The embodiment in FIG. 3, in accordance with the examples in FIG. 1 and FIG. 2, has an end wall 320 (here in the form of a bearing housing cover, but it can be formed from the compressor housing rear wall as well), a sealing sleeve 312, an oil deflection ring 314 (shown here as integral with the sealing sleeve 312, but the two elements can be designed as two separate components as well), an oil guiding means 360 and one or more sealing rings. The details and advantages described in connection with FIGS. 1 and 2 are correspondingly valid for FIG. 3. This means, for example, that the end wall 320 likewise serves to delimit an oil expansion chamber 330 in the direction of a compressor wheel 370, the sealing sleeve 312 is at least partially surrounded in a radial direction by the end wall 320, and the oil guiding means 360 is designed in such a way that an overhang is formed in relation to the oil deflection ring 314 and in a direction radially upward with respect to at least a portion of the oil deflection ring 314, whereby a sealing gap is formed between the overhang of the oil guiding means 360 and the oil deflection ring 314. This manner of arrangement offers the same advantages for the embodiment in FIG. 3 as were described above in connection with FIG. 1.

Unlike the first two embodiments, the oil guiding means 360 in the example in FIG. 3 is not formed integrally with the end wall 320. In contrast to the integral design, the embodiment shown in FIG. 3 has an oil guiding means 360 in the form of an oil deflector plate 360 (given that the identical component is concerned, the same reference sign will be used here). With regard to the overall structure of the oil deflector plate 360, for example concerning mounting and the advantageous tongue, let reference be made to the explanations made regarding the examples in FIGS. 2 and 3, which are equally valid for the oil deflection plate 360 in FIG. 3.

As is shown in FIG. 3, the cross section of the oil deflector plate is at least partially u-shaped (it can be also v-shaped). A radially inner limb of the oil deflector plate 360 thus defines said overhang, which at least partially surrounds the oblique exterior side 316 of the oil deflection ring 314 (whereby the oblique exterior side is likewise formed from a radially outer end of the oil deflection ring 314 inclined in the direction of the compressor wheel). In this way, the sealing gap between the oil deflector ring 314 and the oil guiding means 360 is formed. In a particular further embodiment, which is not shown in the drawings, the overhang can run at least partly parallel to the oblique exterior side 316. FIG. 3 shows that the internal diameter of the oil deflector plate 360 is smaller than the largest external diameter of the oil deflector ring 314. As a consequence of the oil deflector having an exterior side 316 inclined obliquely in the direction of the compressor wheel, a certain axial and radial overlap is formed by two components, the oil deflector ring 314 and the oil deflector plate 360, thereby also forming the advantageous overhang.

Another unique feature of the example shown in FIG. 3 is that the end wall 320 features an inner lip 322 extending in an axial direction and at least partially surrounded at an axial end by the oil deflector ring 314. In this way, a sealing gap is formed between the inner lip 322 and the oil deflector ring 314. As a consequence, in this case a second overhang is formed, this time from the oil deflector ring 314, more precisely the radially outer part of the oil deflector ring 314 inclined obliquely in the direction of the compressor wheel 370 and the extremity of the end wall inner lip 322. In this way, an effective labyrinth is created, which prevents the transfer of oil into the compressor housing interior. In addition, the inner lip 322 features a ring-shaped flow channel 324. This ring-shaped flow channel 324 has the advantageous effect of guiding the oil away from this area of the oil sealing unit 30 in addition to aiding the sealing effect by preventing the oil from moving in the direction of the compressor housing interior. With reference to the examples in FIGS. 1 and 2, the outer circumferential area of the oil deflector plate 360 can also feature a tongue, which extends obliquely and radially outward and serves for returning the oil.

Regarding all of the embodiments described here, in particular the embodiments regarding the oil sealing unit 10, 20, 30 according to the invention illustrated in FIGS. 1 to 3, it is the case that the special design of the overhang via the oil deflector ring 114, 214, 314 has a positive effect on the movements of oil within the oil sealing unit 10, 20, 30, and the sealing effect is consequently enhanced. Depending on operating status and environmental conditions, the oil is thereby directed by the oil guiding means and the oil deflector ring in such a way that it moves as little as possible in the direction of the interior of the compressor housing and is rather guided back to the bearing. Depending on operating status and ambient pressure conditions, doing so will be aided by centrifugal forces and negative pressure situations in relevant areas of the oil sealing unit 10, 20, 30.

The invention further comprises a turbocharger for an internal combustion engine having one of the previously described embodiments of the oil sealing unit 10, 20, 30.

Although the invention has been described above and is defined by the attached claims, it should be understood that the invention can alternatively be defined in accordance with the following embodiments:

1. Oil sealing unit (10; 20; 30) for a turbocharger used to seal a passage from a bearing housing to a compressor housing having
    an end wall (120; 220; 320),
        the end wall (120; 220; 320) for delimiting an oil expansion chamber (130; 230; 330) in the direction of a compressor wheel (170; 270; 370);
    a sealing sleeve (112; 212; 312),
        the sealing sleeve (112; 212; 312) for a non-rotating connection with a shaft (140; 240; 340) connecting the compressor wheel (170; 270; 370) with a turbine wheel,
        wherein the sealing sleeve (112; 212; 312) is at least partially surrounded in the radial direction by the end wall (120; 220; 320);
    an oil deflection ring (114; 214; 314); and
    an oil guiding means (122; 222; 360);
    characterized in that the oil guiding means (122; 222; 360) is designed in such a way that an overhang is formed in relation to the oil deflection ring (114; 214; 314) and in a direction radially upward in relation to at least a portion of the oil deflection ring (114; 214; 314), wherein a sealing gap is formed between the overhang of the oil guiding means (122; 222; 360) and the oil deflection ring (114; 214; 314).
2. Oil sealing unit according to embodiment 1, characterized in that an exterior side (116; 216; 316) of the oil deflection ring (114; 214; 314), which points into the oil expansion chamber (130; 230; 330), runs in an oblique direction relative to a line perpendicular to the axis of the shaft (140; 240; 340).

3. Oil sealing unit according to embodiment 1 or embodiment 2, characterized in that the oil deflection ring (114; 214; 314) and the sealing sleeve (112; 212; 312) form a one-piece component.

4. Oil sealing unit according to any of the embodiments 1 to 3, characterized in that the end wall (120; 220; 320) is formed as a bearing housing cover.

5. Oil sealing unit according to any of the embodiments 1 to 3, characterized in that the end wall (120; 220; 320) is formed as a compressor housing rear wall.

6. Oil sealing unit according to any of the embodiments 1 to 5, characterized in that at least one sealing ring, preferably in the form of a piston ring, and in particular two or three sealing rings are provided between the end wall (120; 220; 320) and the sealing sleeve (112; 212; 312).

7. Oil sealing unit according to any of the embodiments 1 to 6, characterized in that the sealing gap between the overhang and the oil deflector ring (114; 214; 314) has a width of between 0.1 mm and 0.5 mm, specifically between 0.2 and 0.3 mm, and preferably approximately 0.25 mm.

8. Oil sealing unit according to any of the embodiments 1 to 7, characterized in that the width of the oil deflection ring (114) as viewed from a radial direction increases radially inward, thereby forming the oblique exterior 116.

9. Oil sealing unit according to any of the embodiments 1 to 8, characterized in that a radially outward disposed region of the oil deflector ring (114; 214; 314) is inclined in the direction of the compressor wheel (170; 270; 370), thereby forming the oblique exterior side (216; 316).

10. Oil sealing unit according to any of the embodiments 1 to 9, characterized in that the oil guiding means (122; 222) is an integral part of the end wall (120; 220), and the overhang is formed in such a way that oil is directed from the overhang to the oil deflection ring (114; 214).

11. Oil sealing unit according to embodiment 10, characterized in that the overhang and the oil deflection ring (114; 214) together form a labyrinth seal.

12. Oil sealing unit according to embodiment 10 or embodiment 11, characterized in that a sealing gap (150; 250) runs in an axial direction between the overhang and the oil deflection ring (114; 214).

13. Oil sealing unit according to any of the embodiments 10 to 12, characterized in that a sealing gap (152; 252) runs in a radial direction between the oil deflector ring (114; 214) and the end wall (120; 220), in particular wherein the sealing gap (152; 252) running in a radial direction is adjacent to the sealing gap (150; 250) running in an axial direction.

14. Oil sealing unit according to any of the embodiments 10 to 13, characterized in that a sealing gap (254) is formed running in an oblique direction between the end wall (220) and the oil deflection ring (214), in particular adjacent to the sealing gap (252) running in a radial direction.

15. Oil sealing unit according to any of the embodiments 10 to 14, characterized in that the oil deflection ring (114; 214) is adjacent in an axial direction to a bearing boss of a thrust bearing.

16. Oil sealing unit according to any of the embodiments 10 to 15, characterized in that an oil deflection plate (160; 260) is also provided.

17. Oil sealing unit according to embodiment 16, characterized in that the oil deflector plate (160; 260) at least partially delimits the oil expansion chamber (130; 230) axially in the direction of a thrust bearing and/or radial bearing for the shaft.

18. Oil sealing unit according to any of the embodiments 16 to 17, characterized in that the outer circumferential area of the oil deflector plate (160; 260) features a tongue (180), which extends obliquely and radially outward and serves for returning the oil.

19. Oil sealing unit according to any of the embodiments 10 to 18, characterized in that the oil guiding means (122) is designed as a nose-shaped protrusion on the end wall (120), thus forming the overhang.

20. Oil sealing unit according to embodiment 19, characterized in that the protrusion features an oblique outer surface (124), wherein the orientation in particular of the oblique outer surface (124) of the protrusion is approximately parallel to the oblique exterior side (116) of the oil deflector ring (114).

21. Oil sealing unit according to embodiment 20, characterized in that the oblique outer surface (124) of the protrusion constitutes a virtual extension of the oblique exterior side (116) of the oil deflection ring (114).

22. Oil sealing unit according to any of the embodiments 10 to 18, characterized in that the end wall (220) features a recess (224), wherein the oil deflector ring (214) protrudes into the recess (224), and wherein the overhang of the oil guiding means (222) is defined by a sidewall of the recess (224) disposed radially outward.

23. Oil sealing unit according to embodiment 22, if dependent on embodiment 9, characterized in that the radially outward disposed and inclined region of the oil deflector ring (214) protrudes into the recess (224).

24. Oil sealing unit according to embodiment 23, characterized in that a sidewall of the recess (224) disposed radially inward runs in a direction oblique relative to a line perpendicular to the axis of the shaft (140; 240; 340) and preferably parallel to the inclined region of the oil deflector ring (214) exterior side pointing radially inward, in particular wherein a sealing gap (254) is formed, which runs obliquely between the inwardly disposed sidewall and the inwardly pointing exterior side.

25. Oil sealing unit according to any of the embodiments 1 to 9, characterized in that the oil guiding means (360) is provided in the form of an oil deflection plate, in particular wherein the cross section of the oil deflection plate (360) is at least partially v-shaped or u-shaped.

26. Oil sealing unit according to embodiment 25, characterized in that a radially inner limb of the oil deflection plate (360) defines the overhang.

27. Oil sealing unit according to embodiment 25 or embodiment 26, if dependent on embodiment 2, characterized in that the overhang at least partially surrounds the oblique exterior side (316) of the oil deflector ring (314), thereby forming the sealing gap between the oil deflector ring (314) and the oil guiding means (360), and the overhang in particular runs at least partially parallel to the oblique exterior side (316).

28. Oil sealing unit according to any of the embodiments 25 to 27, characterized in that the internal diameter of the oil deflector plate (360) is smaller than the largest external diameter of the oil deflector ring (314).

29. Oil sealing unit according to any of the embodiments 25 to 28, characterized in that the end wall (320) features an inner lip (322) extending in an axial direction and at least partially surrounded at an axial end by the oil deflector ring (314), thereby forming a sealing gap between the inner lip (322) and the oil deflection ring (314).

30. Oil sealing unit according to embodiment 29, characterized in that the inner lip (322) defines a ring-shaped flow channel (324).

31. Oil sealing unit according to any of the embodiments 25 to 30, characterized in that the outer circumferential area of the oil deflector plate (360) features a tongue, which extends obliquely and radially outward and serves for returning the oil.

32. Turbocharger for an internal combustion engine having an oil sealing unit according to any of the embodiments 1 to 31.

The invention claimed is:

1. An oil sealing unit (10; 20; 30) for a turbocharger used to seal a passage from a bearing housing to a compressor housing having
an end wall (120; 220; 320),
the end wall (120; 220; 320) for delimiting an oil expansion chamber (130; 230; 330) in the direction of a compressor wheel (170; 270; 370);
a sealing sleeve (112; 212; 312),
the sealing sleeve (112; 212; 312) for a non-rotating connection with a shaft (140; 240; 340) connecting the compressor wheel (170; 270; 370) with a turbine wheel,
wherein the sealing sleeve (112; 212; 312) is at least partially surrounded in the radial direction by the end wall (120; 220; 320);
an oil deflection ring (114; 214; 314); and
an oil guiding means (122; 222; 360);
the oil guiding means (122; 222; 360) designed in such a way that an overhang is formed in relation to the oil deflection ring (114; 214; 314) and in a direction radially upward in relation to at least a portion of the oil deflection ring (114; 214; 314), wherein a sealing gap having a width of from 0.1 mm to 0.5 mm is formed between the overhang of the oil guiding means (122; 222; 360) and the oil deflection ring (114; 214; 314).

2. The oil sealing unit according to claim 1, wherein an exterior side (116; 216; 316) of the oil deflection ring (114; 214; 314), which points into the oil expansion chamber (130; 230; 330), runs in an oblique direction relative to a line perpendicular to the axis of the shaft (140; 240; 340).

3. The oil sealing unit according to claim 1, wherein the oil deflection ring (114; 214; 314) and the sealing sleeve (112; 212; 312) form a one-piece component.

4. The oil sealing unit according to claim 1, wherein the oil guiding means (122; 222) is an integral part of the end wall (120; 220), and the overhang is formed in such a way that oil is directed from the overhang to the oil deflection ring (114; 214).

5. The oil sealing unit according to claim 4, wherein an oil deflection plate (160; 260) is also provided.

6. The oil sealing unit according to claim 5, wherein the end wall (320) features an inner lip (322) extending in an axial direction and at least partially surrounded at an axial end by the oil deflector ring (314), thereby forming a sealing gap between the inner lip (322) and the oil deflection ring (314).

7. The oil sealing unit according to claim 6, wherein the inner lip (322) defines a ring-shaped flow channel (324).

8. The oil sealing unit according to claim 5, wherein the outer circumferential area of the oil deflector plate (160; 260; 360) features a tongue (180), which extends obliquely and radially outward and serves for returning the oil.

9. The oil sealing unit according to claim 4, wherein the oil guiding means (122) is designed as a nose-shaped protrusion on the end wall (120), thus forming the overhang.

10. The oil sealing unit according to claim 9, wherein the protrusion features an oblique outer surface (124), wherein the orientation of the oblique outer surface (124) of the protrusion is parallel to the oblique exterior side (116) of the oil deflector ring (114).

11. The oil sealing unit according to claim 4, wherein the end wall (220) features a recess (224), wherein the oil deflector ring (214) protrudes into the recess (224), and wherein the overhang of the oil guiding means (222) is defined by a sidewall of the recess (224) disposed radially outward.

12. The oil sealing unit according to claim 11, wherein a region of the oil deflector ring (214) disposed radially outward is inclined in the direction of the compressor wheel (270), thereby forming an oblique exterior side (216; 316), wherein the radially outward disposed and inclined region of the oil deflection ring (214) protrudes into the recess (224).

13. The oil sealing unit according to claim 1, wherein the oil guiding means (360) is provided in the form of an oil deflection plate, wherein the cross section of the oil deflection plate (360) is at least partially v-shaped or u-shaped, wherein a radially inner limb of the oil deflection plate (360) defines the overhang.

14. The oil sealing unit according to claim 13, wherein the overhang at least partially surrounds an oblique exterior side (316) of the oil deflector ring (314), thereby forming the sealing gap between the oil deflector ring (314) and the oil guiding means (360), and the overhang runs, at least partially, parallel to the oblique exterior side (316).

15. The oil sealing unit according to claim 13 wherein the internal diameter of the oil deflector plate (360) is smaller than the largest external diameter of the oil deflector ring (314).

16. A turbocharger for an internal combustion engine having an oil sealing unit (10; 20; 30) according to claim 1.

17. An oil sealing unit (10; 20; 30) for a turbocharger used to seal a passage from a bearing housing to a compressor housing having
an end wall (120; 220; 320), the end wall (120; 220; 320) for delimiting an oil expansion chamber (130; 230; 330) in the direction of a compressor wheel (170; 270; 370);
a sealing sleeve (112; 212; 312), the sealing sleeve (112; 212; 312) for a non-rotating connection with a shaft (140; 240; 340) connecting the compressor wheel (170; 270; 370) with a turbine wheel, wherein the sealing sleeve (112; 212; 312) is at least partially surrounded in the radial direction by the end wall (120; 220; 320);
an oil deflection ring (114; 214; 314); and
an oil guiding means (122; 222; 360), the oil guiding means (122; 222; 360) designed in such a way that an overhang is formed in relation to the oil deflection ring (114; 214; 314) and in a direction radially upward in relation to at least a portion of the oil deflection ring (114; 214; 314), wherein a sealing gap to further improve the sealing action between the oil-bearing areas of the bearing housing and the compressor housing interior is formed between the overhang of the oil guiding means (122; 222; 360) and the oil deflection ring (114; 214; 314), wherein the sealing gap runs axially between the overhang and the oil deflection ring and radially between the oil deflection ring and the end wall.

18. A labyrinth oil sealing unit (30) for a turbocharger used to seal a passage from a bearing housing to a compressor housing having

- an end wall (320), the end wall (320) for delimiting an oil expansion chamber (330) in the direction of a compressor wheel (370);
- a sealing sleeve (312), the sealing sleeve (312) for a non-rotating connection with a shaft (140; 240; 340) connecting the compressor wheel (370) with a turbine wheel, wherein the sealing sleeve (312) is at least partially surrounded in the radial direction by the end wall (320);
- an oil deflection ring (314); and
- an oil guiding means (360);
- the oil guiding means (360) designed in such a way that an overhang is formed in relation to the oil deflection ring (314) and in a direction radially upward in relation to at least a portion of the oil deflection ring (314), wherein a sealing gap is formed between the overhang of the oil guiding means (360) and the oil deflection ring (314), and
- wherein the oil guiding means (360) is provided in the form of an oil deflection plate, wherein the cross section of the oil deflection plate (360) is at least partially v-shaped or u-shaped, wherein a radially inner limb of the oil deflection plate (360) defines the overhang, and wherein the overhang at least partially surrounds an oblique exterior side (316) of the oil deflector ring (314), thereby forming the sealing gap between the oil deflector ring (314) and the oil guiding means (360).

* * * * *